J. Gilfillan,
Water-Closet Valve.
Nº 24,866.           Patented July 26, 1859.
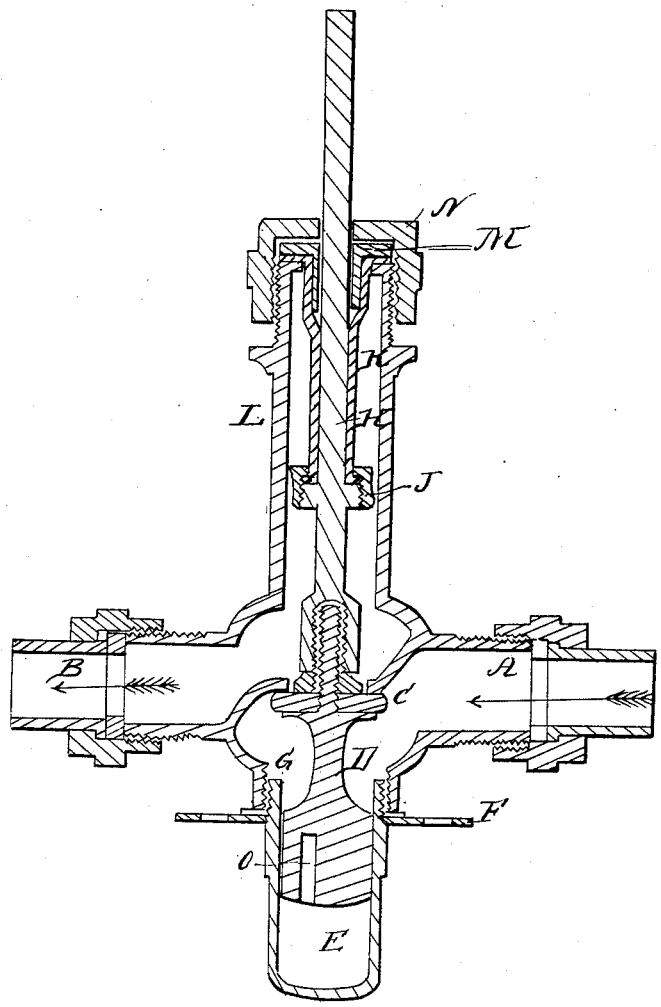
Witnesses:
S. S. Wilder
Jimmy W Bass
Inventor:
James Gilfillan

UNITED STATES PATENT OFFICE.

JAMES GILFILLAN, OF HARTFORD, CONNECTICUT.

VALVE FOR WATER-CLOSETS.

Specification of Letters Patent No. 24,866, dated July 26, 1859.

*To all whom it may concern:*

Be it known that I, JAMES GILFILLAN, of Hartford, county of Hartford, and State of Connecticut, have invented certain new and useful Improvements in Valves for Water-Closets; and I do hereby declare that the same is described and represented in the following specification and drawings, and to enable others skilled in the art to make and use my improvement therein, I will proceed to describe the construction and operation, referring to the drawings, in which the same letters indicate like parts.

In the accompanying drawing is shown a sectional view of my improvement.

A, is the induction connection.

B, is the eduction connection.

C, is the valve.

D, is a suction piston fitted to the chamber E and to which is made a collar or flange F. For the purpose of securing it to the desired place, said flange and chamber are secured to the lower part of the valve by a nipple G.

H, is a valve stem, secured to the valve C by a screw I.

J, is a screw flange coupling on the stem H.

K is what may be called an elastic tubular spring packing, or connection, having flanges on each end, the lower end is secured in the coupling J, the opposite end is secured to the upper end of the valve tube L, by means of a collar M, and cap N, so that there cannot be any leakage of water except as it passes through the valve opening at C.

O, is an air chamber to prevent the thump caused in closing the valve, (when used without some such provision.) My improvement relates to the opening of the valve in the usual manner to give a required flow of water, and to gradually close off the same by the action of the elastic tubular spring K, and the piston D, lifting from the chamber O.

Now it will plainly be seen that by pressing down the stem H by a connection to the ordinary fixings used in water closet arrangements, the valve C, will open and the water will flow through said opening until it is gradualy closed off by the action of the elastic tubular spring K, and piston D. The amount of the flow of water may be regulated by a screw thimble upon the upper end of the spindle H.

I believe I have thus described the construction so as to enable a workman to make the same, and in doing so have also shown the nature of the improvement. The advantage derived therefrom will be seen and understood from its simplicity and perfectness in its operation over others now, or heretofore in use.

What I claim and desire to secure by Letters Patent is—

The combination of elastic tubular spring K, piston D, chamber E operating in the manner as and for the purpose described.

JAMES GILFILLAN.

Witnesses:
   S. I. WILDER,
   JENNY W. BLISS.